(12) United States Patent
Kang et al.

(10) Patent No.: US 11,539,544 B2
(45) Date of Patent: Dec. 27, 2022

(54) ELECTRONIC APPARATUS AND METHOD OF CONTROLLING THE SAME

(71) Applicant: Samsung Electronics Co., Ltd., Suwon-si (KR)

(72) Inventors: Eunhwa Kang, Suwon-si (KR); Yijun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 17/028,177

(22) Filed: Sep. 22, 2020

(65) Prior Publication Data

US 2021/0099320 A1 Apr. 1, 2021

(30) Foreign Application Priority Data

Sep. 27, 2019 (KR) ........................ 10-2019-0119247

(51) Int. Cl.
| | |
|---|---|
| H04L 12/28 | (2006.01) |
| H04W 76/14 | (2018.01) |
| G06F 3/14 | (2006.01) |
| H04R 3/00 | (2006.01) |
| G06F 3/0482 | (2013.01) |

(52) U.S. Cl.
CPC ........ *H04L 12/2816* (2013.01); *G06F 3/0482* (2013.01); *G06F 3/14* (2013.01); *H04R 3/00* (2013.01); *H04W 76/14* (2018.02); *H04R 2420/07* (2013.01)

(58) Field of Classification Search
CPC ........ G06F 3/0482; G06F 3/14; H04W 76/14; H04L 12/2816
See application file for complete search history.

(56) References Cited

U.S. PATENT DOCUMENTS

| | | | | |
|---|---|---|---|---|
| 6,133,847 | A | * 10/2000 | Yang | ................ G05B 19/0426 |
| | | | | 348/176 |
| 2019/0174312 | A1 | * 6/2019 | Cho | ...................... H04W 12/06 |
| 2021/0081157 | A1 | * 3/2021 | Lam | ...................... H04L 67/141 |
| 2021/0099320 | A1 | * 4/2021 | Kang | ...................... H04R 3/00 |

FOREIGN PATENT DOCUMENTS

| | | |
|---|---|---|
| KR | 10-2011-0054814 A | 5/2011 |
| KR | 10-2013-0070809 A | 6/2013 |
| KR | 10-1918040 B1 | 1/2019 |
| KR | 10-1980039 B1 | 5/2019 |

* cited by examiner

*Primary Examiner* — David E Choi
(74) *Attorney, Agent, or Firm* — Jefferson IP Law, LLP (57) ABSTRACT

An electronic apparatus and a controlling method in which a home appliance without a display and a user terminal directly communicate with each other so that a user can control the home appliance through the user terminal are provided. The electronic apparatus includes a communication interface configured to directly communicate with a user terminal, a storage configured to store a graphic user interface, and at least one processor configured to transmit the graphic user interface to the user terminal, and receive a user command through the graphic user interface transmitted to the user terminal.

19 Claims, 8 Drawing Sheets

ELECTRONIC APPARATUS AND METHOD OF CONTROLLING THE SAME

CROSS-REFERENCE TO RELATED APPLICATION(S)

This application is based on and claims priority under 35 U.S.C. § 119 of a Korean patent application number 10-2019-0119247, filed on Sep. 27, 2019, in the Korean Intellectual Property Office, the disclosure of which is incorporated by reference herein in its entirety.

BACKGROUND

1. Field

The disclosure relates to an electronic apparatus that directly communicates with a user terminal, and a method of controlling the same.

2. Description of Related Art

Home appliances may communicate with a user terminal using an Internet. The user terminal may receive a graphical user interface (GUI) of the home appliance from a server, and an application of the user terminal may output the GUI based on data transmitted from the home appliance.

In order to identify and set a status of the home appliance in the user terminal, the user terminal and the home appliance must be connected to the Internet.

Meanwhile, even if the home appliance and the Internet can be connected, it is difficult to perform the above-described operation in the case of the home appliance such as a washing machine that does not have good Internet access.

Therefore, there is a need for research that can perform control by performing communication of the user terminals and the home appliances even without direct communication for the Internet such as wireless fidelity (WiFi).

In particular, in the case of the home appliances that do not have an image outputter such as a display, a detailed control will be possible through connection of the user terminal, so the need for the above-described technology is even greater.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus in which a home appliance without a display and a user terminal directly communicate with each other so that a user can control the home appliance through the user terminal, and a method of controlling the same.

Additional aspects of the disclosure will be set forth in part in the description which follows and, in part, will be obvious from the description, or may be learned by practice of the disclosure.

In accordance with an aspect of the disclosure, an electronic apparatus is provided. The electronic apparatus includes a communication interface configured to directly communicate with a user terminal, a storage configured to store a graphic user interface, and at least one processor configured to transmit the graphic user interface to the user terminal, and receive a user command through the graphic user interface transmitted to the user terminal.

The at least one processor may be further configured to convert the graphic user interface into an output format corresponding to the user terminal, and control the communication interface to transmit the converted graphic user interface to the user terminal in real time.

Based on a communication request signal being received from the user terminal, the at least one processor may be further configured to transmit a response signal corresponding to the communication request signal to the user terminal, and form a direct communication network between the electronic apparatus and the user terminal.

The electronic apparatus may further include an inputter. The at least one processor may be further configured to control the communication interface to transmit a response signal to the user terminal through a response command by the inputter.

The electronic apparatus may further include at least one speaker. Based on a communication request signal being received from the user terminal, the at least one processor may be further configured to output a response guide signal through the at least one speaker.

Based on a response command being input within a predetermined time from a time when a communication request signal is received, the at least one processor may be further configured to form a direct communication network between the electronic apparatus and the user terminal.

The at least one processor may be further configured to receive a communication request signal, and to, based on a response command being input for a predetermined duration from the inputter, form a direct communication network between the electronic apparatus and the user terminal.

The at least one processor may be further configured to receive a control signal for controlling the electronic apparatus from the user terminal, and drive the electronic apparatus in response to the control signal.

Based on a communication termination command being received from the user terminal, the at least one processor may be further configured to cancel communication with the user terminal, and operate in a communication standby state.

In accordance with another aspect of the disclosure, a method of controlling an electronic apparatus is provided. The method includes storing, by a storage, a graphic user interface, directly communicating, by a communication interface, with a user terminal to transmit the graphic user interface to the user terminal, and receiving, by at least one processor, a user command through the graphic user interface transmitted to the user terminal.

The directly communicating with the user terminal to transmit the graphic user interface to the user terminal may further include converting the graphic user interface into an output format corresponding to the user terminal, and transmitting the converted graphic user interface to the user terminal in real time.

The directly communicating with the user terminal may further include, based on receiving a communication request signal from the user terminal, transmitting a response signal corresponding to the communication request signal to the user terminal, and forming a direct communication network between the electronic apparatus and the user terminal.

The directly communicating with the user terminal may further include transmitting the response signal to the user terminal in response to a user input through an inputter.

The directly communicating with the user terminal may further include, based on receiving the communication request signal from the user terminal, controlling to output a response guide signal through at least one speaker provided in the electronic apparatus.

The directly communicating with the user terminal may further include, based on inputting the response signal within a predetermined time from a time when the communication request signal is received, forming the direct communication network between the electronic apparatus and the user terminal.

The directly communicating with the user terminal may further include receiving the communication request signal, and based on a user command being input for a predetermined duration from the inputter, forming a direct communication network between the electronic apparatus and the user terminal.

The receiving of the user command through the graphic user interface transmitted to the user terminal may further include receiving a control signal for controlling the electronic apparatus from the user terminal.

The method may further include, based on receiving a communication termination command from the user terminal, canceling, by the at least one processor, communication with the user terminal, and operating, by the at least one processor, in a communication standby state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Like reference numerals refer to like elements throughout the specification. Not all elements of the embodiments of the disclosure will be described, and the description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 1:
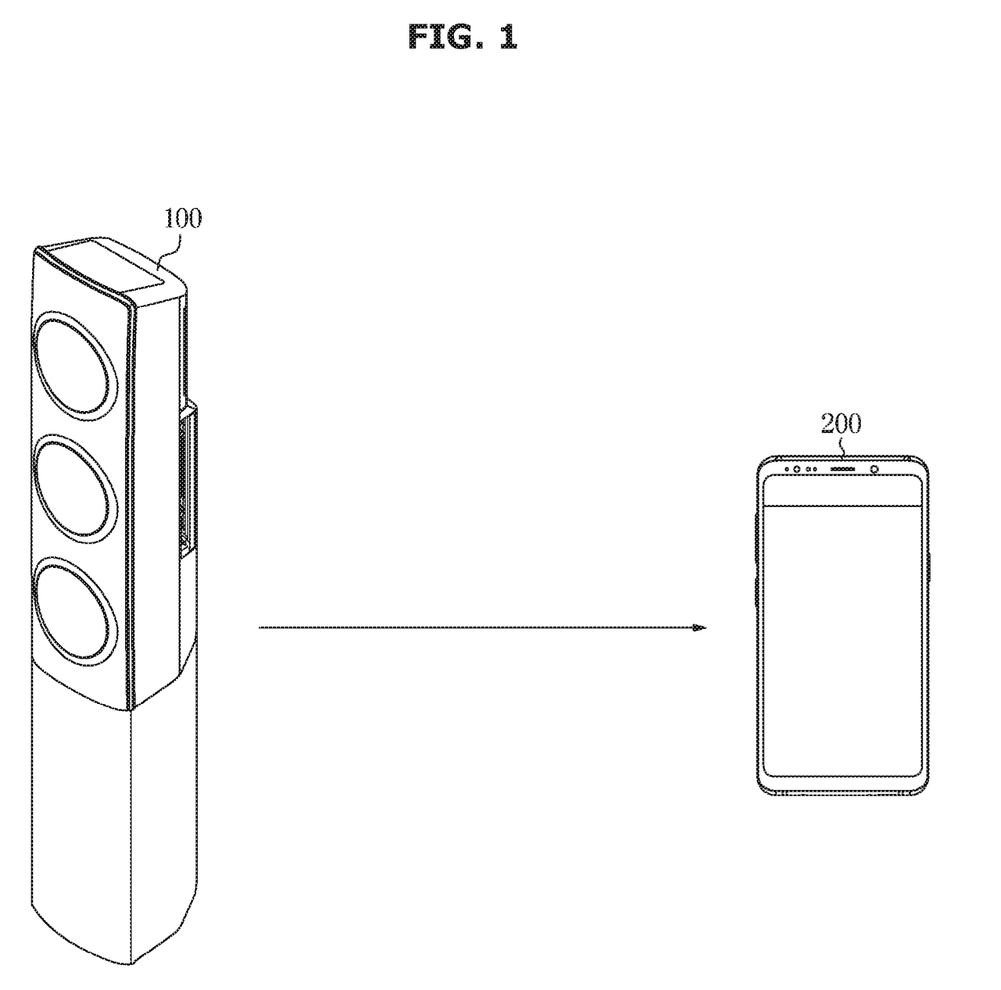
FIG. 1 is a view schematically illustrating a relationship between an electronic apparatus and a display apparatus according to an embodiment of the disclosure.

FIG. 1 is a view schematically illustrating a relationship between an electronic apparatus and a display apparatus according to an embodiment of the disclosure.

Hereinafter, a wireless fidelity display (WFD) is a communication method, which refers to a method of communicating based on a wireless fidelity (Wi-Fi) direct communication standard between display devices.

Referring to FIG. 1, an electronic apparatus 100 may be a device that provides data, and a user terminal 200 may receive data of the electronic apparatus 100. In the Wi-Fi direct communication method, the electronic apparatus 100 and the user terminal 200 may be determined according to capabilities of the device in a capability negotiation step. In particular, the user terminal 200 of the disclosure may correspond to a device displaying audio-video (AV) data.

Meanwhile, in the disclosure, the electronic apparatus 100 may refer to various electronic apparatuses for home use such as a television, a refrigerator, a washing machine, and an air conditioner, but there is no limitation on the type or form thereof.

As an embodiment of the disclosure, the user terminal 200 may receive a user input for controlling the AV data and transmit information related to the user input received by the user terminal 200 to the electronic apparatus 100. Through the method, a user may directly input a command for controlling the AV data into the user terminal 200.

The user terminal 200 may provide information related to an input received from the user to the electronic apparatus 100 through a user input back channel (UIBC).

There is no restriction on the type of the user input through the user terminal 200.

Figure 2:
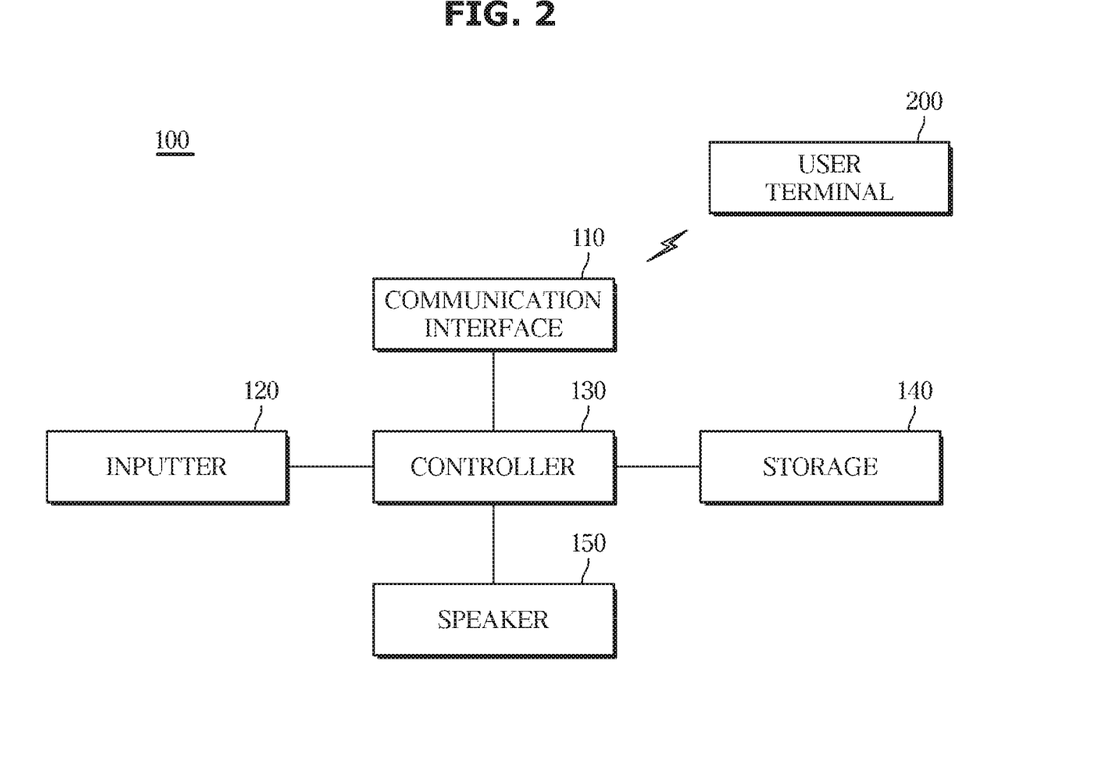
FIG. 2 is a control block diagram according to an embodiment of the disclosure.

FIG. 2 is a control block diagram according to an embodiment of the disclosure.

Referring to FIG. 2, the electronic apparatus 100 may include a communication interface 110 (e.g., a transceiver), an inputter 120, a storage 140 (e.g., a memory), and a controller 130 (e.g., at least one processor).

The electronic apparatus 100 may perform Wi-Fi direct and Miracast communication for home appliances.

As described below, the electronic apparatus 100 cannot view the GUI because there is no a display, but a display rendering module is activated, and the GUI of the home appliances may be stored through activation of the display of a platform.

Meanwhile, the electronic apparatus 100 may communicate with the user terminal 200.

The user terminal 200 may be implemented as a computer or a portable terminal capable of accessing the devices via a network. In particular, the computer may include, for example, a notebook, a desktop, a laptop, a tablet personal computer (PC), a slate PC, and the like, each of which is equipped with a WEB Browser. The user terminal 200 may include, for example, a wearable device such as a Personal Communication System (PCS), or the like as a wireless communication device that is portable and mobile. The portable terminal may be any type of handheld-based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a smart phone, etc., a wearable device such as a watch, a ring, a bracelet, an anklet, a necklace, a pair of glasses, and contact lens, or a head-mounted-device (HMD).

The user terminal 200 may perform Wi-Fi direct and Miracast communication with the electronic apparatus 100.

In addition, the user terminal 200 may store a mirroring application.

The user terminal 200 may transmit touch input coordinates through the UIBC through the mirroring application.

The communication interface 110 may communicate with the user terminal 200.

The communication interface 110 may include one or more components that enable communication with an external device, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wireless communication module may include a wireless fidelity (Wi-Fi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The storage 140 may store a graphic user interface.

In addition, the storage 140 may include the mirroring application for communication with the user terminal 200.

The mirroring application may perform a Wi-Fi display source function based on Wi-Fi direct and Wi-Fi display.

The mirroring application may receive and process input information through the UIBC in a mobile when the user inputs through the user terminal 200.

The storage 140 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto. The storage 140 may be a memory implemented with a chip separate from the aforementioned processor in relation to the controller 130, or may be implemented integrally with the processor in a single chip.

The inputter 120 may be provided in a configuration capable of receiving a user command.

The inputter 120 is a hardware device such as various buttons, switches, pedals, keyboards, mice, track-balls, various levers, handles, and sticks for user input.

The electronic apparatus 100 may be provided as a headless product without the display.

Meanwhile, the electronic apparatus 100 may include at least one speaker 150. As will be described later, the speaker 150 may receive a signal from the controller 130 and output a response guide signal guiding a response command from the user.

The controller 130 may transmit a graphic user interface to the user terminal 200 and control to receive the user command through the graphic user interface transmitted to the user terminal 200.

The controller 130 may convert the graphic user interface into an output format corresponding to the user terminal 200.

The controller 130 may transmit the converted graphic user interface to the user terminal 200 in real time.

Particularly, the controller 130 may encode the graphic user interface and then stream to the user terminal 200 by applying high-bandwidth digital content protection digital rights management (HDCP DRM).

When the controller 130 receives a communication request signal from the user terminal 200, the controller 130 may transmit a response signal corresponding to the communication request signal to the user terminal 200 to form a direct communication network between the electronic apparatus 100 and the user terminal 200.

Meanwhile, upon receiving the communication request signal from the user terminal 200, the controller 130 may control to output the response guide signal through the at least one speaker 150.

Particularly, upon receiving the communication request signal from the user terminal 200, the mirroring application driven by the controller 130 may perform a text to speech (TTS) to output the response guide signal that induces the response command to the user through the speaker 150 provided in the electronic apparatus 100.

The direct communication network may be configured with Wi-Fi direct.

The controller 130 may transmit the response signal to the user terminal 200 based on the response command through the inputter 120.

When the response command is input within a predetermined time from the time when the communication request signal is received, the controller 130 may form the direct communication network between the electronic apparatus 100 and the user terminal 200.

The response command is input by the user to initiate communication between the electronic apparatus 100 and the user terminal 200. According to the embodiment, the user may input the response command through an operation of pressing the button provided on the electronic apparatus 100.

When the controller 130 receives the communication request signal and the response command is input from the inputter 120 for a predetermined duration, the direct communication network between the electronic apparatus 100 and the user terminal 200 may be formed.

The user may input the response command through the operation of pressing the button provided on the electronic apparatus 100 for the predetermined duration.

The controller 130 may receive a control signal for controlling the electronic apparatus 100 from the user terminal 200 and drive the electronic apparatus 100 in response to the control signal.

Particularly, the user may transmit the number of pointers, an ID of the pointer, an X coordinate value, and a Y coordinate value to the electronic apparatus 100 through the user terminal 200.

When receiving a communication termination command from the user terminal 200, the controller 130 may cancel communication with the user terminal 200 and operate in a communication standby state.

The communication standby state may refer to a state of always waiting to receive a connection request in a peer to peer (P2P) listen state.

The controller 130 may include a memory configured to store an algorithm to operate the components in the electronic apparatus 100 or data regarding a program that executes the algorithm, and a processor configured to perform the aforementioned operation using the data stored in the memory. The memory and the processor may be implemented in separate chips. Alternatively, the memory and the processor may be implemented in a single chip.

At least one component may be added or deleted corresponding to the performance of the components of the electronic apparatus 100 illustrated in FIG. 2. It will be readily understood by those skilled in the art that the mutual position of the components may be changed corresponding to the performance or structure of the electronic apparatus 100.

In the meantime, each of the components illustrated in FIG. 2 may be referred to software and/or hardware components such as a field programmable gate array (FPGA) and an application specific integrated circuit (ASIC).

Figure 3:
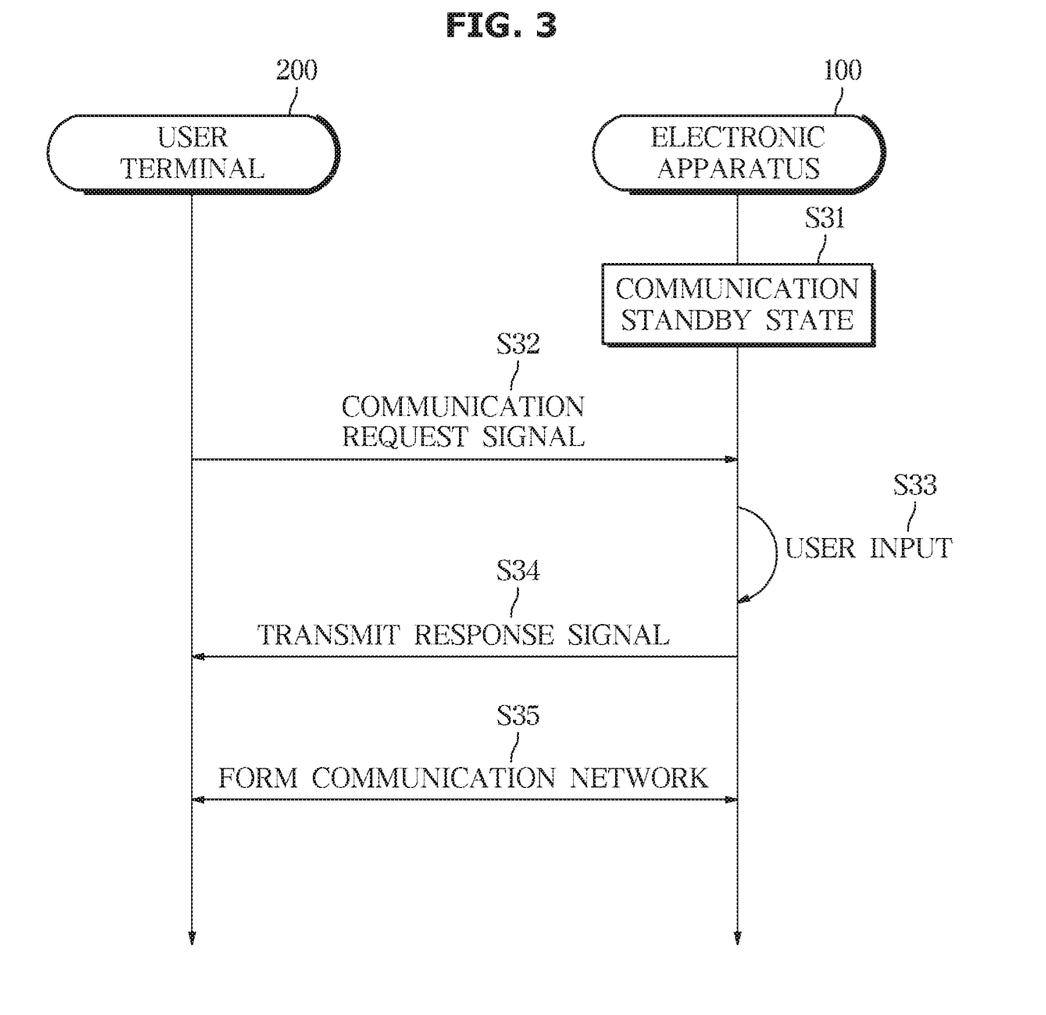
FIG. 3 is a view for describing an operation of forming a communication network between a user terminal and an electronic apparatus according to an embodiment of the disclosure.

FIG. 3 is a view for describing an operation of forming a communication network between a user terminal and an electronic apparatus according to an embodiment of the disclosure.

Referring to FIG. 3, when the electronic apparatus 100 is driven, the electronic apparatus 100 may activate a mirroring application and may operate in the communication standby state that is the P2P listen state (operation S31).

The user may transmit the communication request signal to the electronic apparatus 100 through the user terminal 200 (operation S32).

The user may select the electronic apparatus 100 to be connected through the user terminal 200.

The electronic apparatus 100 may output a signal guiding the user of the signal received from the user terminal 200.

For example, when the electronic apparatus 100 receives the communication request signal from the user terminal 200, the electronic apparatus 100 may output the response guide signal such as "press a 00 button of the product to agree to the mirroring connection request." through the speaker 150.

In response to this, the user may input the response command through the inputter 120 provided in the electronic apparatus 100 (operation S33).

The user may input the response command through the inputter 120 provided in the electronic apparatus 100. The controller 130 may transmit the response signal to the user terminal 200 when the communication request signal is received and input within a predetermined time (operation S34).

When the electronic apparatus 100 transmits the response signal to the user terminal 200, the communication network between the response signal and the user terminal 200 may be formed (operation S35).

The communication network may be configured with Wi-Fi direct.

Furthermore, the user terminal 200 and the electronic apparatus 100 may perform connection through a real-time streaming protocol (RTSP) according to Miracast conditions. In addition, the electronic apparatus 100 and the display apparatus may connect the Wi-Fi display and UIBC functions.

Figure 4:
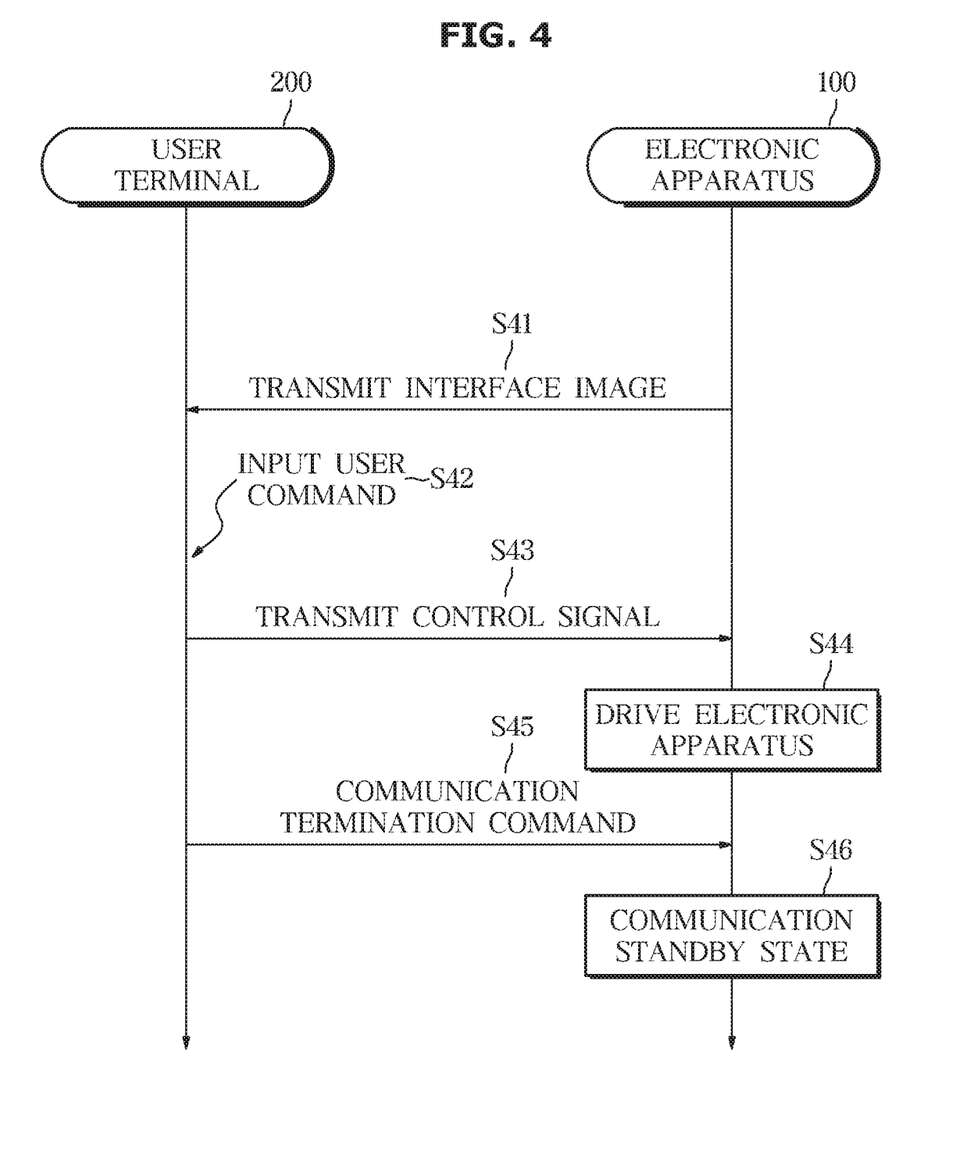
FIG. 4 is a view illustrating an operation of controlling an electronic apparatus through a user terminal according to an embodiment of the disclosure.

FIG. 4 is a view illustrating an operation of controlling an electronic apparatus through a user terminal according to an embodiment of the disclosure.

Referring to FIGS. 3 and 4, after the user terminal 200 and the electronic apparatus 100 form the communication network, the electronic apparatus 100 may transmit the graphic user interface to the user terminal 200 (operation S41).

Particularly, the electronic apparatus 100 may perform an operation of encoding the graphic user interface and then streaming to the user terminal 200 by applying HDCP DRM.

The user terminal 200 may receive interface data through streaming and output the interface data to the display provided in the user terminal 200.

The user may input the user command for controlling the electronic apparatus 100 through the user terminal 200 (operation S42).

Particularly, the user may input the command to the user terminal 200.

The user may input the command by touching the user terminal 200. The input may be transmitted to the electronic apparatus 100 as the control signal including the number of pointers, the ID of the pointer, the X coordinate value, and the Y coordinate value according to Miracast's specification (operation S43).

The electronic apparatus 100 may drive the electronic apparatus 100 by receiving information on the control signal (operation S44).

Meanwhile, when the user transmits the communication termination command to the electronic apparatus 100 through the user terminal 200, the communication between the user terminal 200 and the electronic apparatus 100 may be terminated (operation S45 and operation S46).

In this case, the electronic apparatus 100 may be driven in the communication standby state that is a state before communication with the user terminal 200.

Meanwhile, the operations described in FIGS. 3 and 4 are only the embodiment of the disclosure, and there is no limitation on the operation in which the electronic apparatus 100 and the user terminal 200 communicate with each other.

Figure 5:
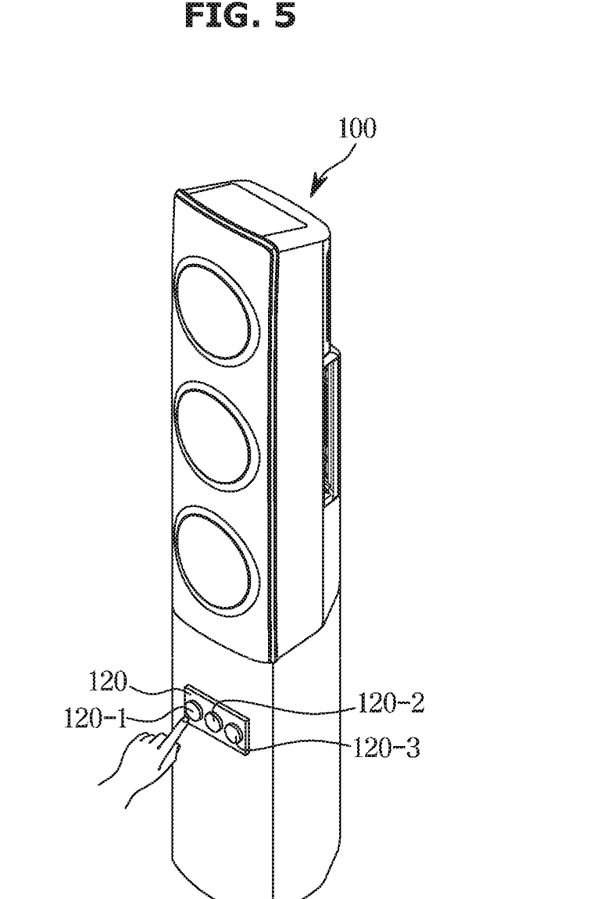
FIG. 5 is a view illustrating an inputter of an electronic apparatus according to an embodiment of the disclosure.

FIG. 5 is a view illustrating an inputter of an electronic apparatus according to an embodiment of the disclosure.

Referring to FIG. 5, an air conditioner is illustrated as an example of the electronic apparatus 100.

Meanwhile, the electronic apparatus 100 of the disclosure may be provided as the device without an outputter such as the display.

Meanwhile, the electronic apparatus 100 may include the inputter 120.

The inputter 120 is a hardware device such as various buttons, switches, pedals, keyboards, mice, track-balls, various levers, handles, and sticks for user input.

FIG. 5 illustrates a case in which the inputter 120 is provided with buttons 120-1, 120-2, and 120-3.

Meanwhile, when the electronic apparatus 100 and the user terminal 200 communicate, the user terminal 200 may transmit the communication request signal to the electronic apparatus 100, and the electronic apparatus 100 may form the communication network between the electronic apparatus 100 and the user terminal 200 by transmitting the response signal in response to the communication request signal.

At this time, the response signal transmitted by the electronic apparatus 100 may be formed in response to the response command input by the user.

In inputting the response command, the user may input the response command through the inputter 120 provided in the electronic apparatus 100.

FIG. 5 illustrates that the user inputs the response command by pressing one of the buttons 120-1 provided in the inputter 120.

Meanwhile, each of the buttons 120-1, 120-2, and 120-3 included in the inputter 120 may be the button required to drive the electronic apparatus 100, but may be separately provided for communication with the user terminal 200.

When the electronic apparatus 100 receives the communication request signal, the electronic apparatus 100 may output a sound signal that induces the input of the response command.

The user may form the direct communication network between the electronic apparatus 100 and the user terminal 200 by inputting the response command within the predetermined time from the time when the communication request signal is received.

Particularly, when the electronic apparatus 100 receives the communication request signal from the user terminal 200, at least one of the inputters 120 provided in the electronic apparatus 100 may be determined as a configuration capable of receiving the response command. The user may control the electronic apparatus 100 to transmit the response signal to the user terminal 200 by inputting the response command to the electronic apparatus 100 through the inputter 120.

When the response command is input before the communication request signal is received, since the electronic apparatus 100 does not determined the inputter 120 as the configuration for receiving the response command, a normal control of the electronic apparatus 100 may be performed.

According to another embodiment, the controller 130 may receive the communication request signal, and may form the direct communication network between the electronic apparatus 100 and the user terminal 200 only when the response command is input from the inputter 120 for the predetermined duration.

In this case, when the user presses the button for less than the predetermined duration, the controller 130 may perform the normal control of the electronic apparatus 100. Only when the button is pressed beyond the predetermined duration. The controller 130 may operate as inputting the response command and transmit the response signal to the user terminal 200.

According to another embodiment, the electronic apparatus 100 may provide a separate component to the inputter 120 to receive the response command.

Meanwhile, the configuration of the inputter 120 described in FIG. 5 is only the embodiment of the disclosure, and there is no limitation on a shape of the inputter 120 or the operation in which the user inputs the response command.

Figure 6A:
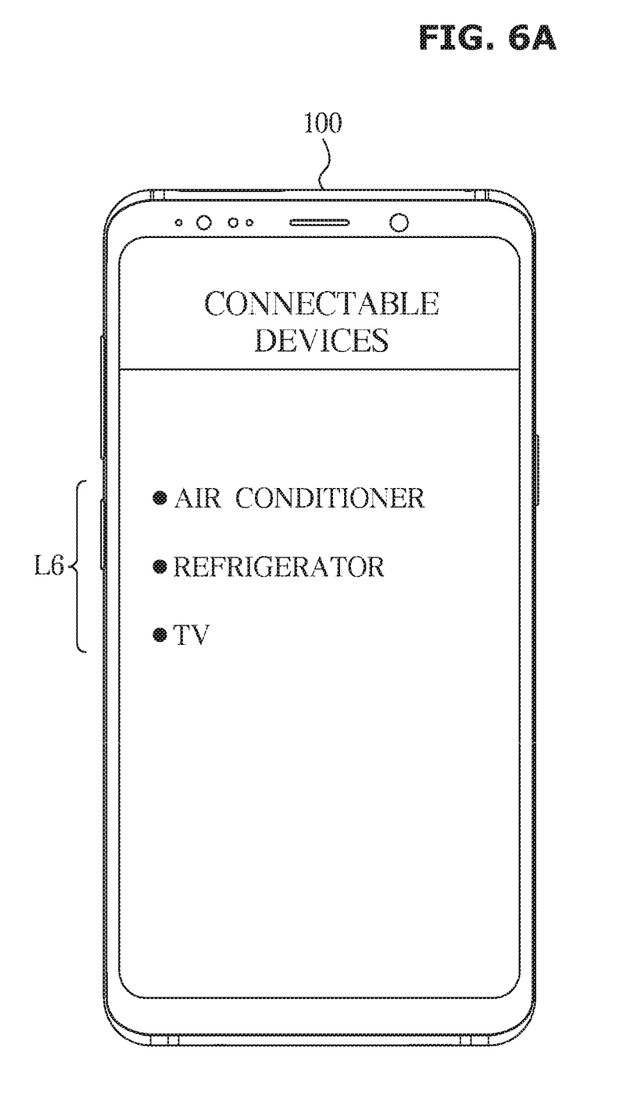
FIGS. 6A and 6B are views illustrating a display of a user terminal according to various embodiments of the disclosure.
Figure 6B:
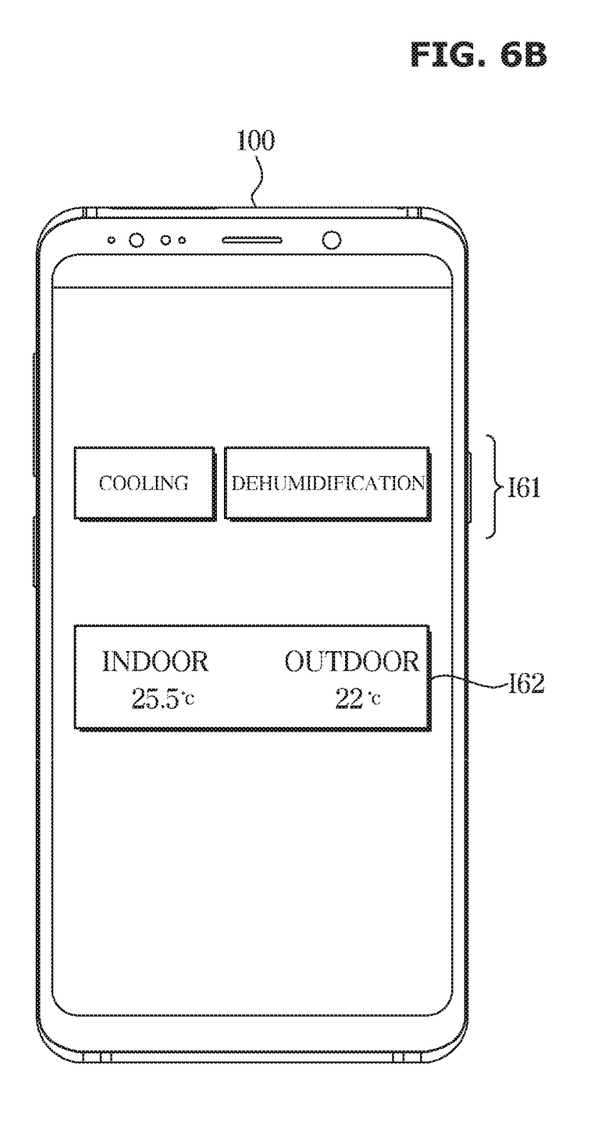

FIGS. 6A and 6B are views illustrating a display of a user terminal according to various embodiments of the disclosure.

Referring to FIG. 6A, it is a view illustrating the operation of selecting the electronic apparatus 100 to be connected in forming the communication network between the user terminal 200 and the electronic apparatus 100. The user may select the electronic apparatus 100 to be connected using the mirroring application of the user terminal 200 (L6 shown in FIG. 6A).

FIG. 6A illustrates a case where the user selects a stand type air conditioner.

Meanwhile, after the communication network between the electronic apparatus 100 and the user terminal 200 is formed, the user terminal 200 may output the graphic user interface received from the electronic apparatus 100 to an outputter of the user terminal 200.

FIG. 6B illustrates the graphical user interface.

Referring to FIG. 6B, it illustrates the graphic user interface including configurations 161 and 162 necessary for controlling the electronic apparatus 100.

According to the embodiment of the disclosure, when the electronic apparatus 100 is the air conditioner, the graphic user interface may include the configuration 161 capable of determining an operation mode such as "cooling" and "dehumidification".

In addition, the graphical user interface may include the configuration 162 for inputting a desired temperature.

When the user inputs the user command in the graphic user interface output to the user terminal 200, the user terminal 200 may transmit the control signal to the electronic apparatus 100, and the controller 130 of the electronic apparatus 100 may control the electronic apparatus 100 in response to the control signal.

Meanwhile, FIGS. 6A and 6B are embodiments for describing the operation of the disclosure, and there is no limitation on the type of the electronic apparatus 100 and the graphic user interface corresponding to the electronic apparatus 100.

Figure 7:
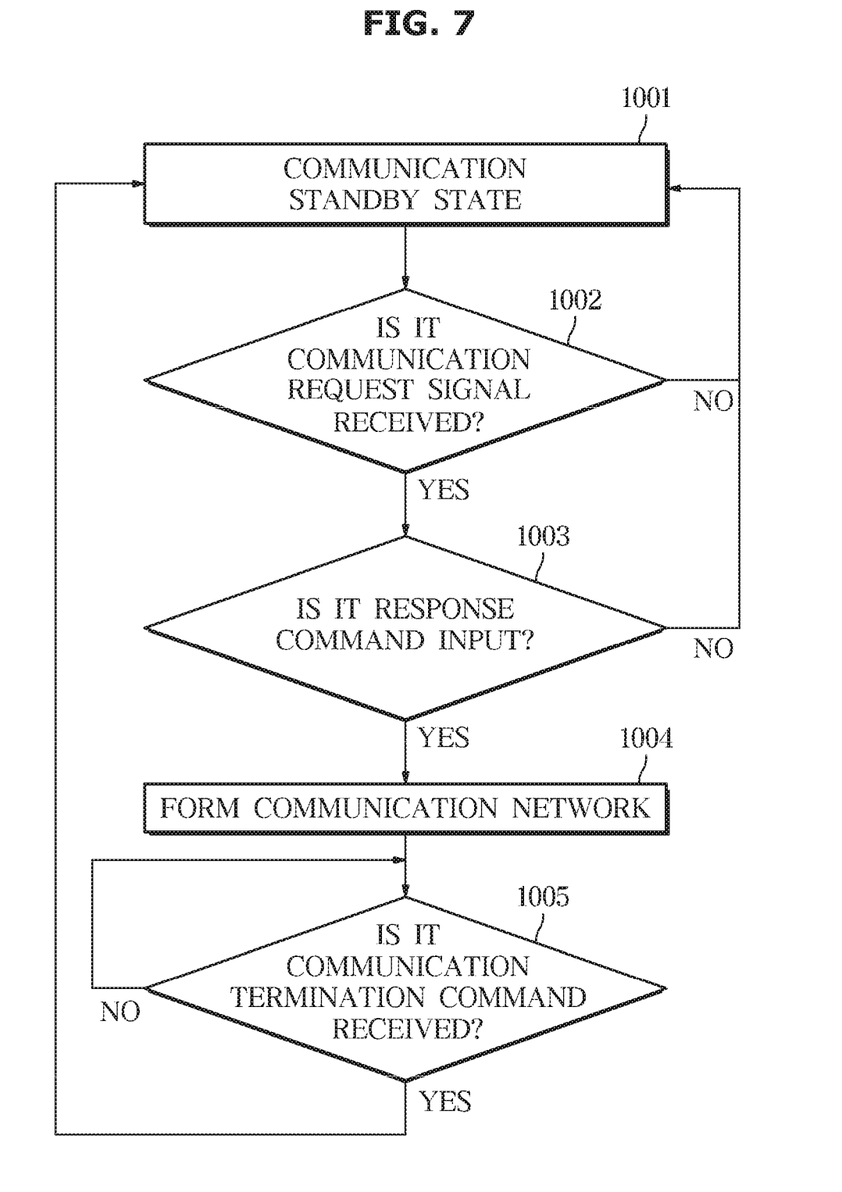
FIG. 7 is a view illustrating a flow chart according to an embodiment of the disclosure.

FIG. 7 is a view illustrating a flow chart according to an embodiment of the disclosure.

Referring to FIG. 7, the electronic apparatus 100 may operate in the communication standby state (operation 1001). The electronic apparatus 100 may receive the communication request signal. Meanwhile, when the electronic apparatus 100 does not receive the communication request signal, the electronic apparatus 100 may operate in the communication standby state again.

On the other hand, when the communication request signal is received (operation 1002) and the response command is input (operation 1003), the electronic apparatus 100 and the user terminal 200 may form the communication network (operation 1004).

Even if the communication request signal is received, if the response command is not input from the user, the electronic apparatus 100 may operate in the communication standby state again.

When the electronic apparatus 100 and the user terminal 200 form the communication network, the user may transmit the control signal to the electronic apparatus 100 through the user terminal 200.

In addition, when the user inputs the communication termination command through the user terminal 200 (operation 1005) and the electronic apparatus 100 receives the communication termination command, the electronic apparatus 100 may operate in the communication standby state again.

According to the electronic apparatus and the method of controlling the electronic apparatus according to the embodiments, a home appliance without the display and the user terminal directly communicate, so that the user can control the home appliance through the user terminal.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a communication interface configured to directly communicate with a user terminal;
   a storage configured to store a graphic user interface applied to the electronic apparatus; and
   at least one processor configured to:
      based on a communication request signal being received from the user terminal while operating in a communication standby state, control the communication interface to transmit, to the user terminal, a response signal corresponding to the communication request signal,
      form a direct communication network between the electronic apparatus and the user terminal when the communication interface transmits the response signal,
      based on the direct communication network being formed while directly communicating with the user terminal, control the communication interface to transmit the graphic user interface stored in the storage to the user terminal, and
      control the communication interface to receive a user command through the graphic user interface transmitted to the user terminal.

2. The electronic apparatus of claim 1, wherein the at least one processor is further configured to:
   convert the graphic user interface into an output format corresponding to the user terminal, and
   control the communication interface to transmit the converted graphic user interface to the user terminal in real time.

3. The electronic apparatus of claim 1, further comprising:
   an inputter,
   wherein the at least one processor is further configured to control the communication interface to transmit the response signal to the user terminal through a response command by the inputter.

4. The electronic apparatus of claim 1, further comprising:
   at least one speaker,
   wherein, based on the communication request signal being received from the user terminal, the at least one processor is further configured to output a response guide signal through the at least one speaker.

5. The electronic apparatus of claim 3, wherein, based on the response command being input within a predetermined amount of time from a time of receiving the communication request signal, the at least one processor is further configured to form the direct communication network between the electronic apparatus and the user terminal.

6. The electronic apparatus of claim 3, wherein the at least one processor is further configured to:
   based on the response command being input for a predetermined duration from the inputter, form the direct communication network between the electronic apparatus and the user terminal.

7. The electronic apparatus of claim 1, wherein the at least one processor is further configured to:
- receive, from the user terminal, a control signal for controlling the electronic apparatus, and
- in response to receiving the control signal, drive the electronic apparatus.

8. The electronic apparatus of claim 1, wherein, based on a communication termination command being received from the user terminal, the at least one processor is further configured to:
- cancel communication with the user terminal, and
- operate in the communication standby state.

9. A method of controlling an electronic apparatus, the method comprising:
- storing, by a storage, a graphic user interface;
- based on a communication request signal being received from a user terminal while operating in a communication standby state, control a communication interface to transmit, to the user terminal, a response signal corresponding to the communication request signal;
- forming a direct communication network between the electronic apparatus and the user terminal when the communication interface transmits the response signal;
- based on the direct communication network being formed while directly communicating with the user terminal using the communication interface, transmitting the graphic user interface to the user terminal; and
- receiving, by at least one processor, a user command through the graphic user interface transmitted to the user terminal.

10. The method of claim 9, wherein the directly communicating with the user terminal comprises:
- converting the graphic user interface into an output format corresponding to the user terminal; and
- transmitting the converted graphic user interface to the user terminal in real time.

11. The method of claim 10, wherein the directly communicating with the user terminal further comprises, in response to a user input through an inputter, transmitting the response signal to the user terminal.

12. The method of claim 11, wherein the directly communicating with the user terminal further comprises, based on receiving the communication request signal from the user terminal, outputting a response guide signal through at least one speaker of the electronic apparatus.

13. The method of claim 11, wherein the directly communicating with the user terminal further comprises, based on inputting the response signal within a predetermined amount of time from a time of receiving the communication request signal, forming the direct communication network between the electronic apparatus and the user terminal.

14. The method of claim 11, wherein the directly communicating with the user terminal further comprises:
- based on the user command being input for a predetermined duration from the inputter, forming the direct communication network between the electronic apparatus and the user terminal.

15. The method of claim 9, wherein the receiving of the user command through the graphic user interface transmitted to the user terminal comprises receiving a control signal for controlling the electronic apparatus from the user terminal.

16. The method of claim 9, further comprising:
- based on receiving a communication termination command from the user terminal, canceling, by the at least one processor, communication with the user terminal; and
- operating the at least one processor in the communication standby state.

17. The electronic apparatus of claim 1, further comprising:
- an inputter,
- wherein the at least one processor is further configured to, in response to a response command being applied to the inputter for an amount of time equal to or greater than a predetermined amount of time, form the direct communication network.

18. The electronic apparatus of claim 1, wherein the at least one processor is further configured to encode the graphical user interface and stream the encoded graphical user interface to the user terminal by applying high-bandwidth digital content protection digital rights management (HDCP DRM).

19. The method of claim 9, wherein the directly communicating with the user terminal comprises:
- encoding the graphical user interface; and
- streaming the encoded graphical user interface to the user terminal by applying high-bandwidth digital content protection digital rights management (HDCP DRM).

* * * * *